US010804764B2

(12) United States Patent
Ramy et al.

(10) Patent No.: US 10,804,764 B2
(45) Date of Patent: Oct. 13, 2020

(54) SYSTEMS AND METHODS FOR AIR-COOLING MOTOR COMPONENTS

(71) Applicant: WOLONG ELECTRIC AMERICA LLC, Dover, DE (US)

(72) Inventors: Gannon Michael Ramy, Fort Wayne, IN (US); Madhava Prasad Tunuguntla, Hyderabad (IN); Sasidharan Nair, Hyderabad (IN); Balasubramaniam V., Chennai (IN); Sreeja Chandran, Hyderabad (IN); Kenny Loyd, Murfreesboro, TN (US)

(73) Assignee: WOLONG ELECTRIC AMERICA LLC, Dover, DE (US)

( * ) Notice: Subject to any disclaimer, the term of this patent is extended or adjusted under 35 U.S.C. 154(b) by 102 days.

(21) Appl. No.: 16/081,565

(22) PCT Filed: Dec. 12, 2016

(86) PCT No.: PCT/EP2016/081142
§ 371 (c)(1),
(2) Date: Aug. 31, 2018

(87) PCT Pub. No.: WO2017/108562
PCT Pub. Date: Jun. 29, 2017

(65) Prior Publication Data
US 2019/0097489 A1 Mar. 28, 2019

(30) Foreign Application Priority Data
Dec. 23, 2015 (IN) .......................... 6861/CHE/2015

(51) Int. Cl.
*H02K 5/15* (2006.01)
*H02K 5/173* (2006.01)
*H02K 9/06* (2006.01)
*H02K 9/04* (2006.01)
*H02K 9/19* (2006.01)

(52) U.S. Cl.
CPC ............. *H02K 5/1732* (2013.01); *H02K 5/15* (2013.01); *H02K 9/04* (2013.01); *H02K 9/06* (2013.01); *H02K 9/19* (2013.01)

(58) Field of Classification Search
CPC .......... H02K 5/1732; H02K 5/15; H02K 9/04; H02K 9/06; H02K 9/19
USPC ......................................................... 310/90
See application file for complete search history.

(56) References Cited

U.S. PATENT DOCUMENTS 2,494,200 A 1/1950 Ramqvist

FOREIGN PATENT DOCUMENTS

| GB | 876599 | 9/1961 |
|---|---|---|
| JP | S59169349 | 9/1984 |
| JP | S60245442 | 12/1985 |
| JP | 2001271796 A | 10/2001 |
| RU | 2 058 450 C1 | 4/1996 |

OTHER PUBLICATIONS

European Patent Office, "Communication pursuant to Article 94(3) EPC", dated Feb. 5, 2020, 4 pp.

*Primary Examiner* — Terrance L Kenerly
(74) *Attorney, Agent, or Firm* — Eckert Seamans Cherin & Mellott, LLC

(57) ABSTRACT

Systems and methods include a channel (114) through an upper endshield (50) that directs an air stream to cool bearings (30), lubricant, and electrical originated heat.

14 Claims, 7 Drawing Sheets

SYSTEMS AND METHODS FOR AIR-COOLING MOTOR COMPONENTS

CROSS REFERENCE TO RELATED APPLICATIONS

This application is a U.S. National Stage Application under 35 U.S.C. Section 371 of PCT International Application No. PCT/EP2016/081142, filed on Dec. 15, 2016, entitled "SYSTEMS AND METHODS FOR AIR-COOLING MOTOR COMPONENTS" which claims priority from Indian Patent Application No. 6861/CHE/2015, filed on Dec. 23, 2015, both of which are incorporated herein by reference.

FIELD OF THE INVENTION

The technical field relates to systems and methods for cooling motors components including, bearings, lubricant, and electrical components.

BACKGROUND OF THE INVENTION

Vertical, High Thrust, Totally Enclosed Fan Cooled (TEFC) motors traditionally locate the thrust bearings and lubricant reservoir adjacent to the electrical component heat source. In addition to electrical component heat, thrust bearings of motors generate heat as a function of many factors including rolling friction, sliding friction, and drag losses. The combined heat loss has customarily been absorbed by the lubricant and then removed from the lubricant by various heat transfer methods at a location that is away from the heat sources. For example, such heat transfer methods include air cooling and heat exchangers.

However, these heat transfer methods have various costs that may restrict their use. For example, open loop water cooling has a relatively high cost due to infrastructure costs, operating costs, and environmental impact that may restrict its use.

BRIEF DESCRIPTION OF THE INVENTION

The systems and methods described herein provide a simple and low cost cooling method that maintains acceptable temperatures of motor components including the bearings and the lubricant. One advantage of the systems and methods described herein is that the electrical component heat source has been separated from the lubricant reservoir. Additionally, the bearing housing and electrical component housing are directly air cooled. As a result, more heat can be removed from the bearing and thus greater thrust load capability or bearing life is possible without water cooling.

Another advantage of the systems and methods described herein is reduced cost, for example, because bearing cooling can be performed without pumps, heat exchangers, heat pipes, and the like. Other advantages of the systems and methods described herein is that they are scalable to larger and smaller vertical motor frame sizes, and have the ability to accept an accessory motor driven blower for high ambient environments.

As applied in an exemplary Totally Enclosed Fan Cooled (TEFC) induction motor, an air stream is routed through a channel in an upper endshield to cool bearings, cool an oil reservoir, and cool electrical components. In certain embodiments, the channel and a wall of a fan cover guard improve mass, volume, and vortex rotation of the air stream and thereby improves cooling of the bearings, oil reservoir, and electrical components.

The present invention provides a motor, e.g., a TEFT induction motor, comprising: a stator frame housing a rotor and a stator in an electrical components housing space; an endshield at least partially covering an open end of the stator frame and housing a bearing in a bearing housing space; a fan cover guard housing a fan, wherein the endshield is positioned between the stator frame and the fan cover guard; a shaft to which each of the rotor and the bearing is connected, wherein the shaft defines a longitudinal axis; a channel that is configured to direct an air stream that moves in a downstream direction, wherein the channel is configured to direct the air stream: through the endshield; and from an upstream end of the channel, radially inward toward the bearing.

An inner wall of the channel may include a wall between the channel and the open end of the stator frame.

An inner wall of the channel may include a wall between the channel and the bearing housing space.

An outer wall of the channel may include a wall between the channel and an oil reservoir.

The channel may include a plurality of tubes, wherein each of the plurality of tubes includes an inner wall, an outer wall, a first side wall, and a second side wall. Each of the first side wall and the second side wall may extend between the inner wall and the outer wall. Each of the first side wall and the second side wall may be a planar structure extending in a radially outward direction from the inner wall to the outer wall. The outer wall may include a wall between the tube and an oil reservoir. The inner wall of the channel may include a wall between the tube and the bearing housing space. At least one of the first side wall and the second side wall may include one of an oil feed tube and an oil outlet drain that connects the oil reservoir to the bearing housing space.

A cross-sectional area along a path through the channel may narrow at the upstream ends of the plurality of tubes.

The upstream end of the channel may be located between the fan and the bearing along the longitudinal axis.

The channel may be configured to direct the air stream radially outward away from the bearing to a downstream end of the channel.

The bearing may be located between the upstream end of the channel and the downstream end of the channel along the longitudinal axis. A first radial distance to the channel, at a point along the longitudinal axis that is aligned with the bearing, may be less than each of: a second radial distance to the upstream end of the channel; and a third radial distance to the downstream end of the channel. Each radial distance is measured from the longitudinal axis in a radial direction.

The endshield may include an oil reservoir and the channel separates the bearing housing from the oil reservoir.

The endshield may include an oil reservoir and the channel separates the oil reservoir from the electrical components housing space.

In one embodiment, the shaft is a first shaft, the motor is a first motor, and the fan is attached to one of: the first shaft; and a second shaft, wherein the second shaft is configured to be driven by a second motor.

The fan guard may direct the air stream radially inward toward the bearing. A top wall of the oil reservoir may have an upstream outer surface that is configured to direct air radially inward, e.g., from a wall of the fan cover guard to the upstream opening of the channel.

The present invention further provides an endshield, comprising: a first end configured to at least partially cover an open end of a stator frame, wherein the stator frame is configured to house a rotor and a stator; a bearing housing space configured to house a bearing that is attached to a shaft, wherein the shaft defines a longitudinal axis; a second end configured to attach to a fan cover guard, wherein the fan cover guard is configured to house a fan; a channel that is configured to direct an air stream from the second end to the first end, wherein the air stream moves in a downstream direction from the second end to the first end; and an oil reservoir, wherein the channel the channel separates: the bearing housing space from the oil reservoir; and the oil reservoir from first end.

The channel may be configured to at least one of: direct the air stream from the second end radially inward toward the bearing housing space; and direct the air stream away from the bearing housing space radially outward toward the first end.

An inner wall of the channel may include: a wall between the channel and the first end; and a wall between the channel and the bearing housing space. An outer wall of the channel may include a wall between the channel and the oil reservoir.

The channel may include a plurality of tubes. Each of the tubes is defined by the inner wall, the outer wall, a first side wall, and a second side wall. Each of the first side wall and the second side wall extends between the inner wall and the outer wall.

The foregoing has broadly outlined some of the aspects and features of the various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

Figure 1:
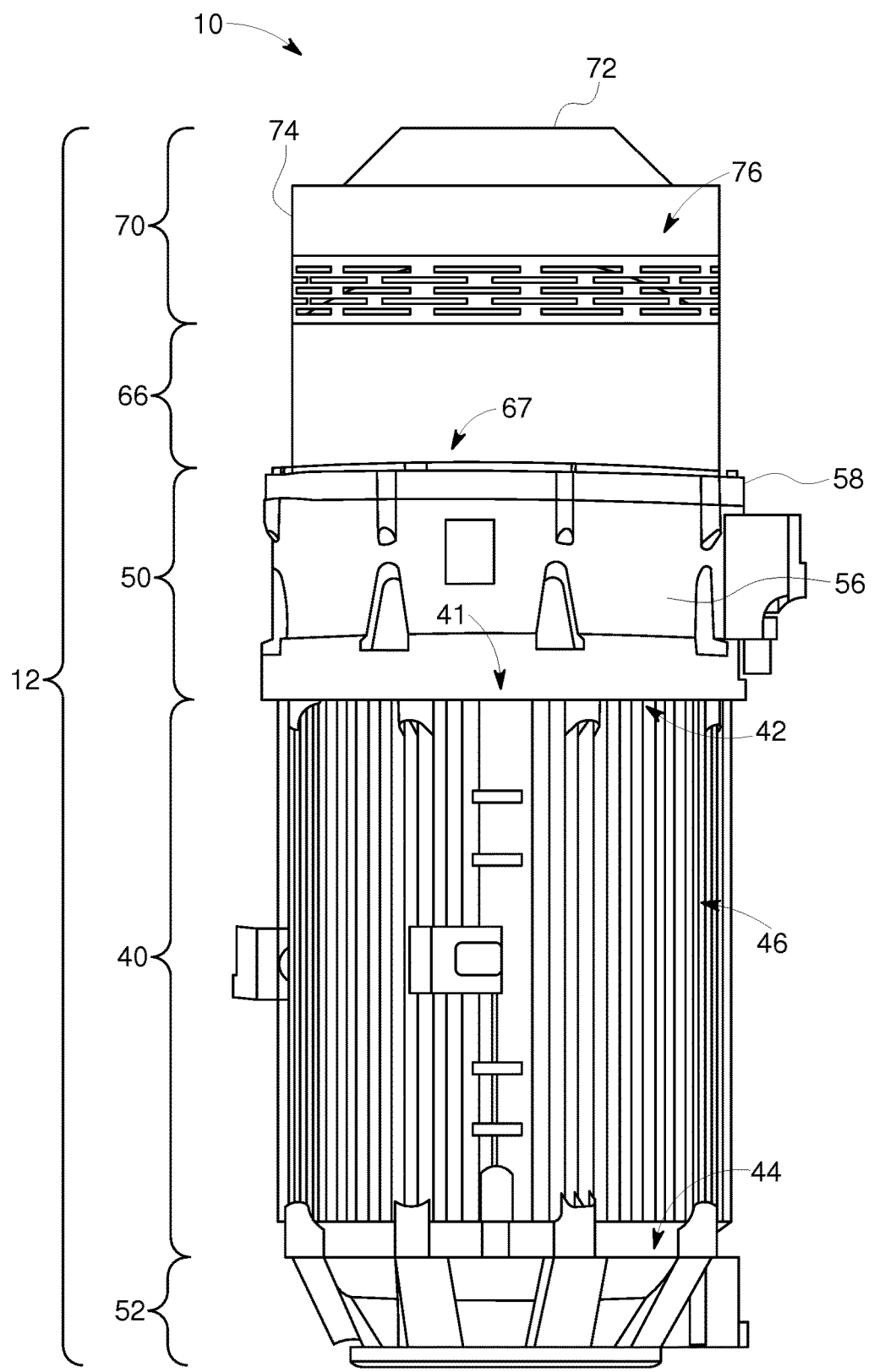
FIG. 1 is a side elevational view of a totally enclosed fan cooled (TEFC) induction motor, according to an exemplary embodiment.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments.

DETAILED DESCRIPTION

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Exemplary embodiments are described herein in the context of a Totally Enclosed Fan Cooled (TEFC) induction motor. However, the systems and methods described herein are applicable to other vertical motors including: Totally Enclosed Blower Cooled, API 610 Compliant, IEEE 841 Compliant, API 541 Compliant, API 547 Compliant, and Hazardous Location Compliant.

Figure 2:
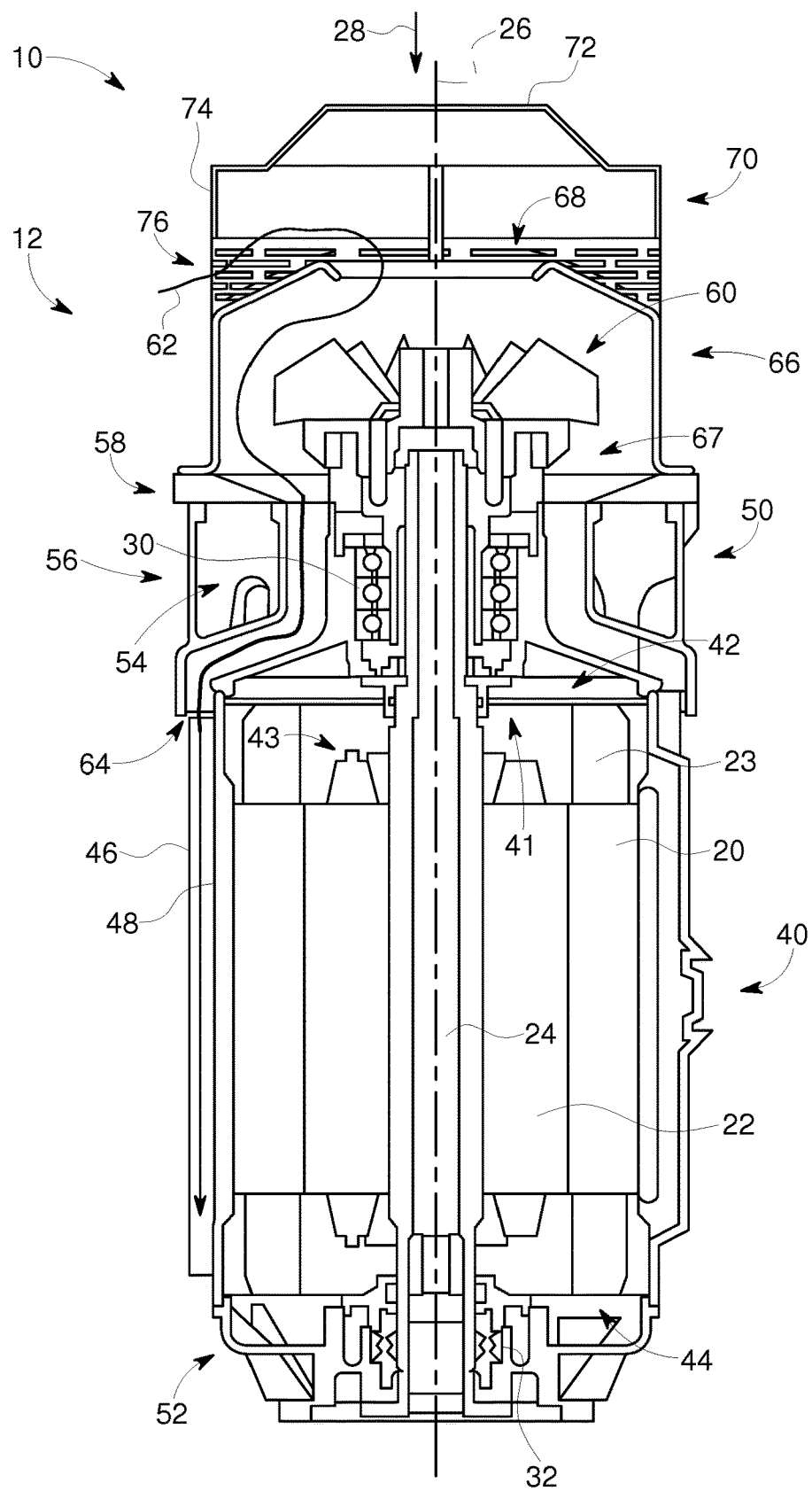
FIG. 2 is a side elevational cross-sectional view of the TEFC induction motor of FIG. 1.

FIGS. 1-2 TEFC Induction Motor

FIGS. 1 and 2 illustrate a TEFC induction motor 10 including an enclosure assembly 12.

Generally described, the TEFC induction motor 10 includes electrical components including a stator 20, a rotor 22, and fins 23. The stator 20 is a part of the magnetic structure of the induction motor 10 that does not rotate. The stator 20 usually includes a primary winding and the fins 23 remove heat from the stator 20.

The rotor 22 is attached to a shaft 24. The rotor 22 is a rotating part of the induction motor 10. Current that is induced in the rotor 22 reacts with the magnetic field produced by the stator 20 to produce torque and rotation.

The shaft includes a longitudinal axis 26. For purposes of teaching, a downstream longitudinal direction 28 is shown as a direction of movement along the longitudinal axis 26. The terms "downstream" and "upstream" are used to describe relative positions with respect to a direction of air flow along a path. Particularly, air flows in a downstream direction along a path.

A radial axis is perpendicular to the longitudinal axis 26. An outward radial direction is a direction moving away from the longitudinal axis 26 along a radial axis. An inward radial direction is a direction moving toward the longitudinal axis 26 along a radial axis.

An upper bearing 30 and a lower bearing 32 are attached to the shaft 24 and allow the shaft 24 to rotate relative to the enclosure assembly 12. The terms "upper" and "lower" are used for purposes of description and are not intended to limit the orientation of the TEFC induction motor 10. Each of the bearings 30, 32 include one or more bearings. The bearings may be various type of bearings. For example, the bearings are thrust bearings such as angular contact ball bearings or spherical roller thrust bearings.

The stator 20, the rotor 22, and the fins 23 are enclosed in electrical component housing that includes a stator frame 40. The stator frame 40 is the main housing for the motor 10 and can be formed from materials including aluminum, steel, or cast iron. The stator frame 40 has a cylindrical shape with a longitudinal axis (i.e., a cylindrical axis) and opposed open ends—an upper open end 42 and a lower open end 44. A longitudinal axis of the stator frame 40 is generally the same as the longitudinal axis 26 of the shaft 24.

The stator frame 40 includes fins 46 on an outer surface 48 of the stator frame 40.

The electrical component housing further includes an upper endshield 50 and lower endshield 52. Endshields are also commonly referred to as cover plates, end brackets, or end bells. Generally described, each endshield 50, 52 supports a bearing 30, 32 and acts as a protective guard to the electrical components and rotating parts (e.g., windings) of the motor 10.

The lower endshield 52 is attached to the stator frame 40 to at least partially cover the lower open end 44 and further enclose the stator 20, the rotor 22, and the fins 23. The lower endshield 52 supports and houses the lower bearing 32.

The upper endshield 50 is attached to the stator frame 40 such that a downstream end 41 at least partially covers the upper open end 42 and further encloses the stator 20, the rotor 22, and the fins 23. Here, electrical component housing includes the stator frame 40, the upper endshield 50, and the lower endshield 52, which define an electrical components housing space 43.

In the exemplary embodiment, the upper endshield 50 includes separable components including a base 56 and a cover 58.

The upper endshield 50 supports and houses the upper bearing 30. Referring to FIG. 2, the upper endshield includes an oil reservoir 54. During operation, a fan 60 moves air along a path 62 through the upper endshield 50, which cools the upper bearing 30, the oil reservoir 54, and the electrical components (e.g., the stator 20, the rotor, 22, and fins 23). The path 62 continues out of the upper endshield 50 through an air outlet 64 and over the fins 46 and outer surface 48 of the stator frame 40 to cool the electrical components (e.g., the stator 20, the rotor 22, and the fins 23).

The fan 60 is attached to the shaft 24 and is positioned upstream from the upper endshield 50. The upper endshield 50 may at least partially house the fan 60. In an alternative embodiment described in further detail below, the fan 60 is attached to a shaft of an accessory motor.

Continuing with FIGS. 1 and 2, the enclosure assembly 12 includes a fan cover guard 66 that attaches to an upstream end 67 of the upper endshield 50. The fan cover guard 66 covers the fan 60, for example, to direct the air flow toward the upper endshield 50 and to keep out solid objects. The fan cover guard 66 includes a top opening 68 that allows air to enter the fan cover guard 66.

The enclosure assembly 12 includes a top cap 70 that attaches to an outer end of the fan cover guard 66. The top cap 70 includes an end wall 72 that obstructs rain (and other objects) from entering the top opening 68 directly in the downstream longitudinal direction 28. The top cap 70 includes a sidewall 74 with a screened air intake 76. The screened air intake 76 allows air to enter the top cap 70 in a radial direction and move through the top opening 68 into the fan cover guard 66.

Figure 3:
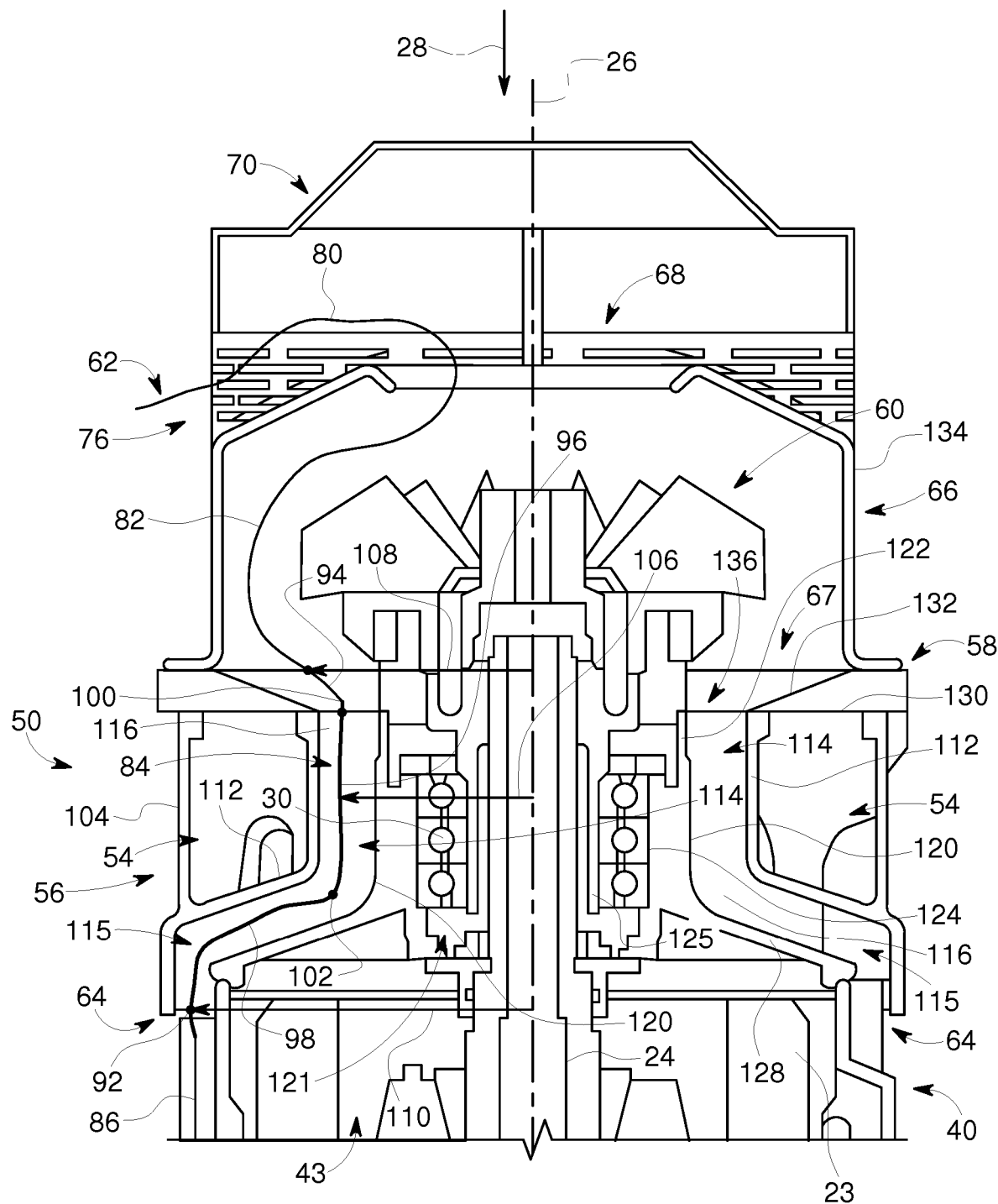
FIG. 3 is a partial side elevational cross-sectional view of the TEFC induction motor of FIG. 1.

FIG. 3 Air Stream Path

Referring to FIG. 3, the path 62 is described in further detail. The fan 60 moves air (e.g., an air stream) along the path 62. For purposes of description, the path 62 includes segments 80, 82, 84, 86.

The first segment 80 of the path 62 begins at the screened air intake 76 and extends into the top cap 70. The path 62 continues along the second segment 82 from the top cap 70, through the top opening 68, into the fan cover guard 66, through the fan 60, and to the upstream end 67 of the upper endshield 50. At the upstream end 67 of the upper endshield 50, the air flow in the fan cover guard 66 enters a channel 114 in the upper endshield 50.

The path 62 continues along the third segment 84 thorough the channel 114 in the upper endshield 50. The channel 114 includes an upstream end 90 and a downstream end 92. At the base 56, the channel 114 includes a plurality of tubes 115 that are defined by sidewalls 116 (e.g., fins).

Generally, the third segment 84 is configured to cool the upper bearing 30, the oil reservoir 54, and the electrical components. The description of the third segment 84 is applicable to the corresponding structure of the channel 114 that directs the third segment 84. For example, the description of the third segment 84 is applicable to the walls of the channel 114 described in further detail below.

The third segment 84 includes a radially inward segment 94, a medial segment 96 (or a radially innermost point as discussed below), and a radially outward segment 98. The radial inward segment 94 moves radially inward and in the downstream longitudinal direction 28 from the upstream end 90 of the channel 114 to an upstream end 100 of the medial segment 96. At the upstream end 100 of the medial segment 96, the flow through the channel 114 is divided into airstreams (segments 96, 98) that move through the tubes 115. For purposes of teaching, the path 62 is only described in detail with respect to one of the tubes 115. However, the description is applicable to paths through each of the tubes 115.

The medial segment 96 is adjacent and between the upper bearing 30 and the oil reservoir 54. The radial outward segment 98 moves radially outward and in longitudinally downstream direction from a downstream end 102 of the medial segment 96 to the downstream end 92 of the channel 114 (here, the downstream ends of the tubes 115 are the downstream end of the channel 114). The radially outward segment 98 is adjacent and between the oil reservoir 54 and the electrical component housing space 43.

The medial segment 96 is offset from an outer surface 104 of the upper endshield 50. For example, the medial segment 96 is closer to the longitudinal axis 26 than to the outer surface 104 of the upper endshield 50. Air moving along the medial segment 96 has a conduction path (e.g., radial distance) to the upper bearing 30 that is shorter than that of a parallel path along the outer surface 104 of the upper endshield 50 (or otherwise the surface or outer wall of the enclosure assembly 12). As such, the upper bearing 30 is one of the heat sources at which the air stream is focused.

In alternative embodiments, the medial segment 96 is curved or is characterized by an innermost point. Here, the third segment 84 may be characterized by a radial distance 106 from the longitudinal axis 26 to the innermost point of the third segment 84, which is less than each of a radial distance 108 to the upstream end 90 and a radial distance 110 to the downstream end 92. Alternatively, the radial distances 108, 110 can be characterized by distances from the longitudinal axis 26 to the surface or outer wall of the enclosure assembly 12.

The third segment 84 curves around an oil reservoir wall 112 of the oil reservoir 54 to cool the oil lubricant housed in the oil reservoir 54. The curvature of the oil reservoir wall 112 over which the third segment 84 moves has a surface area that is greater than a flat wall. Here, the oil reservoir wall 112 includes an inner wall and lower wall of the oil reservoir 54 such that air flowing along the third segment 84 cools the inner wall and lower wall of the oil reservoir 54. The surface area of the oil reservoir wall 112 improves the heat transfer from the oil reservoir 54.

Each of the tubes 115 is defined by the oil reservoir wall 112 (e.g., an inner wall of the oil reservoir is an outer wall of each of the channels 114) and a bearing housing wall 120. As described in further detail below, each of the tubes 115 is further defined by two of the sidewalls 116 (e.g., fins). In alternative embodiments, the sidewalls 116 are omitted from the channel 114.

Moving in the downstream direction, beginning at the upstream end 90, the channel 114 moves radially inward towards the upper bearing 30 and then radially outward away from the upper bearing 30 to the downstream end 92 (e.g., to outlet 64). Because of the change in direction, the air flow through each channel 114 may be characteristically described as a venturi, as a vortex, or as turbulent. Similarly, because of a change in cross sectional area at the upstream end 100 of the medial segment 96 (e.g., where the air flow is divided to move through the tubes 115), the air flow through each tube 115 may be characteristically described as a venturi, as a vortex, or as turbulent.

The bearing housing wall 120 houses the upper bearing 30 and a bearing journal 125. The bearing housing wall 120 defines a space in which the upper bearing 30 is housed—referred to herein as a bearing housing space 121. As described in further detail below, the bearing housing wall 120 includes an oil splash wall 122 and a bearing wall 124.

An electrical components housing wall 128 further defines the channel 114. The electrical components housing wall 128 extends in a radially outward and downstream direction. For example, the electrical components housing wall 128 extends parallel to the lower wall of the oil reservoir wall 112. The electrical components housing wall 128 is configured to interface with an upper edge of the stator frame 40 and at least partially covers the upper open end 42. The electrical components housing wall 128 houses electric components (e.g., radial fins 23) of the TEFC induction motor 10 and thereby allows heat exchange from the internal electrically heated turbulent air in the electrical component housing to the air flowing through the channel 114 along the third segment 84. Further, the channel 114 separates the electrical component heat source from the oil reservoir 54.

The path 62 continues along the fourth segment 86 from the downstream end 92, out the air outlet 64, and over the outer surface of the stator frame 40 to further cool the electrically heated turbulent air in the stator frame 40. The fan 60 pushes air out the air outlet 64 and over the stator frame 40.

FIG. 3 Cover

Referring to FIG. 3, the cover 58 of the upper endshield 50 is described in further detail. The cover 58 provides a top wall 130 of the oil reservoir 54 and has an upstream outer surface 132 that is configured to direct air radially inward from a wall 134 of the fan cover guard 66 to the upstream openings 136 of the tubes 115 in the base 56. For example, the upstream outer surface 132 defines an outer wall of the channel 114 and the radially inward segment 94 of the third segment 84. Alternatively, the channel 114 can be defined to include tubes 115 with an upstream opening at the upstream end 67 of the upper endshield 50 such that the air flow from the fan cover guard 66 is divided and directed inwardly at the same time.

The cover 58 also provides part of the housing around the upper bearing 30 and structure to support the fan 60.

Figure 4:
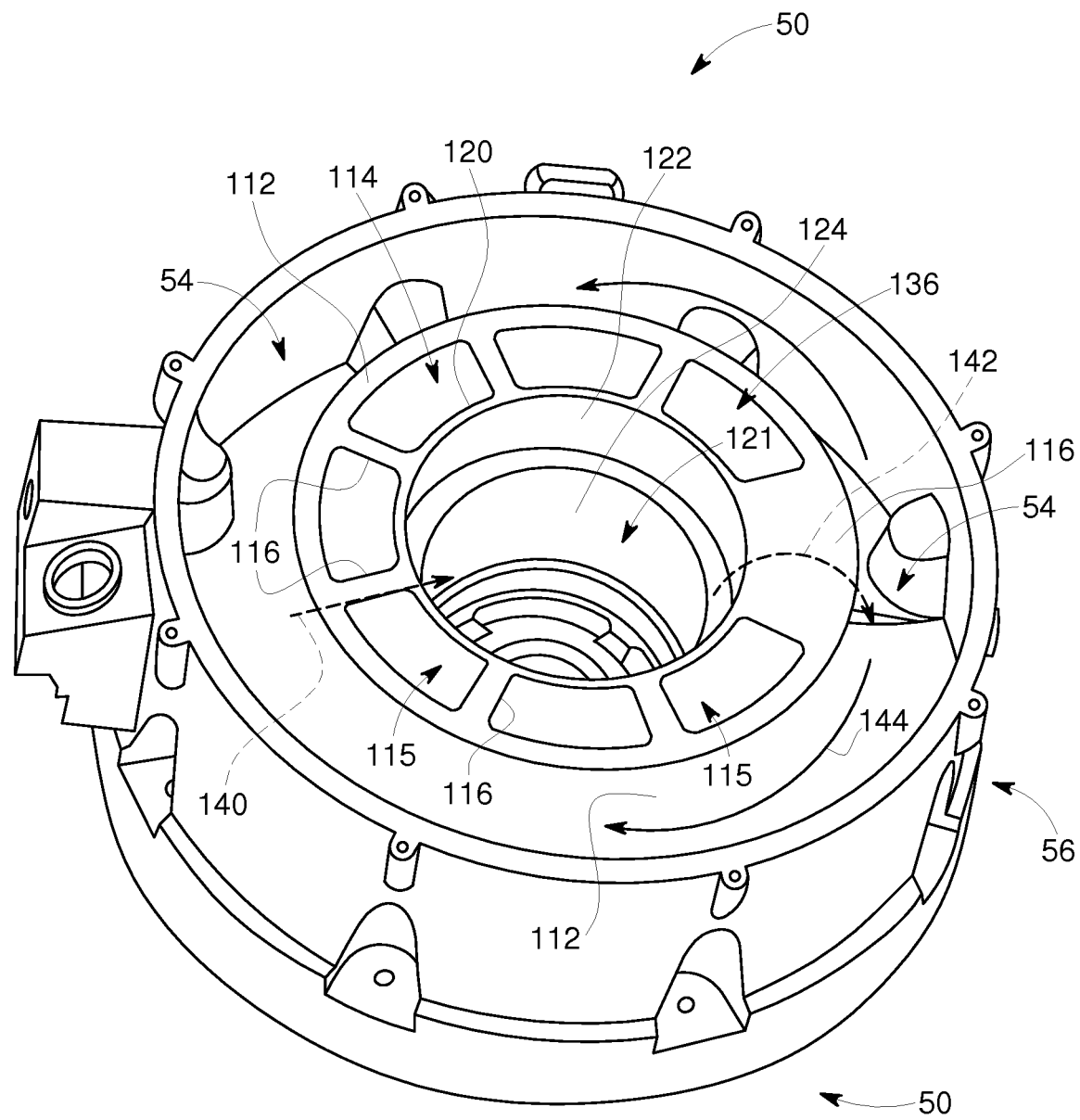
FIG. 4 is a perspective view of a downstream end of an upper endshield of the TEFC induction motor of FIG. 1.
Figure 5:
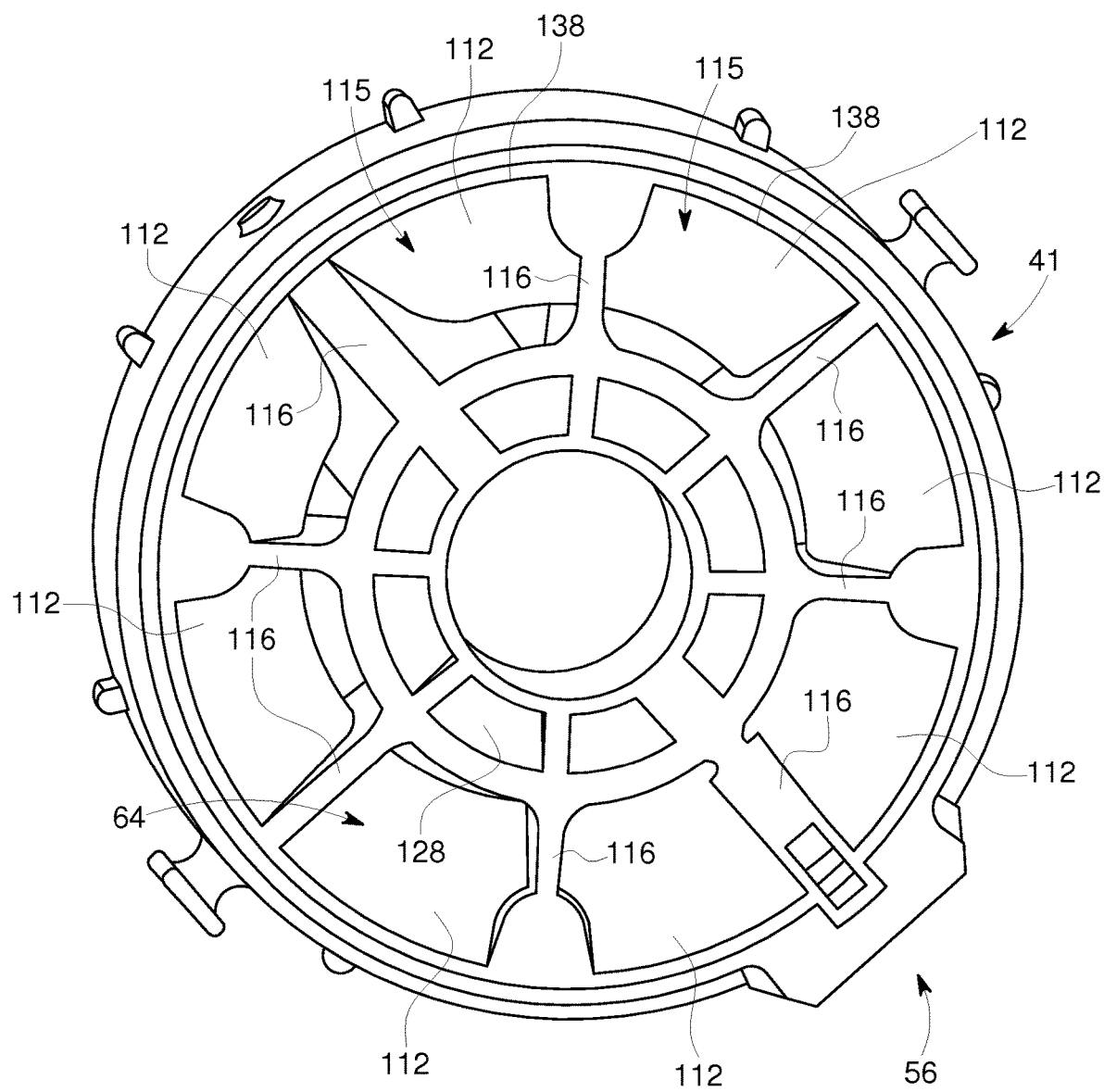
FIG. 5 is a perspective view of an upstream end of an upper endshield, according to an exemplary embodiment.

FIGS. 4 and 5 Base

Referring to FIGS. 4 and 5, the base 56 is described in further detail. Referring to FIG. 4, an upstream end of the base 56 is illustrated and shows the oil reservoir 54, the bearing wall 120, and the bearing housing space 121. Referring to FIG. 5, a downstream end 41 of the base 56 is illustrated to show the downstream openings 138 of the tubes 115 (e.g., collectively, air outlet 64), the oil reservoir wall 112, and the electrical components housing wall 128.

Referring to FIGS. 4 and 5, each of the sidewalls 116 extends between the oil reservoir wall 112 and the bearing housing wall 120 and between the oil reservoir wall 112 and the electrical components housing wall 128. For example, each sidewall 116 is a planar structure that is defined by radial and longitudinal dimensions (e.g., shaped like a fin to maximize heat transfer). As such, each tube 115 is defined by a pair of sidewalls 116, the oil reservoir wall 112, and the bearing housing wall 120, an upstream opening 136, and a downstream opening 138 (e.g., at the air outlet 64).

The sidewalls 116 separating the individual tubes 115 provide additional surface area to remove heat, via convection, from the bearing 30, lubricant in the oil reservoir 54, and electrical components (stator 20, rotor 22, and fins 23) in the electrical components housing space 43. For example, heat is transferred to the sidewalls 116 via conduction heat transfer from walls 120, 112, 128.

Figure 6:
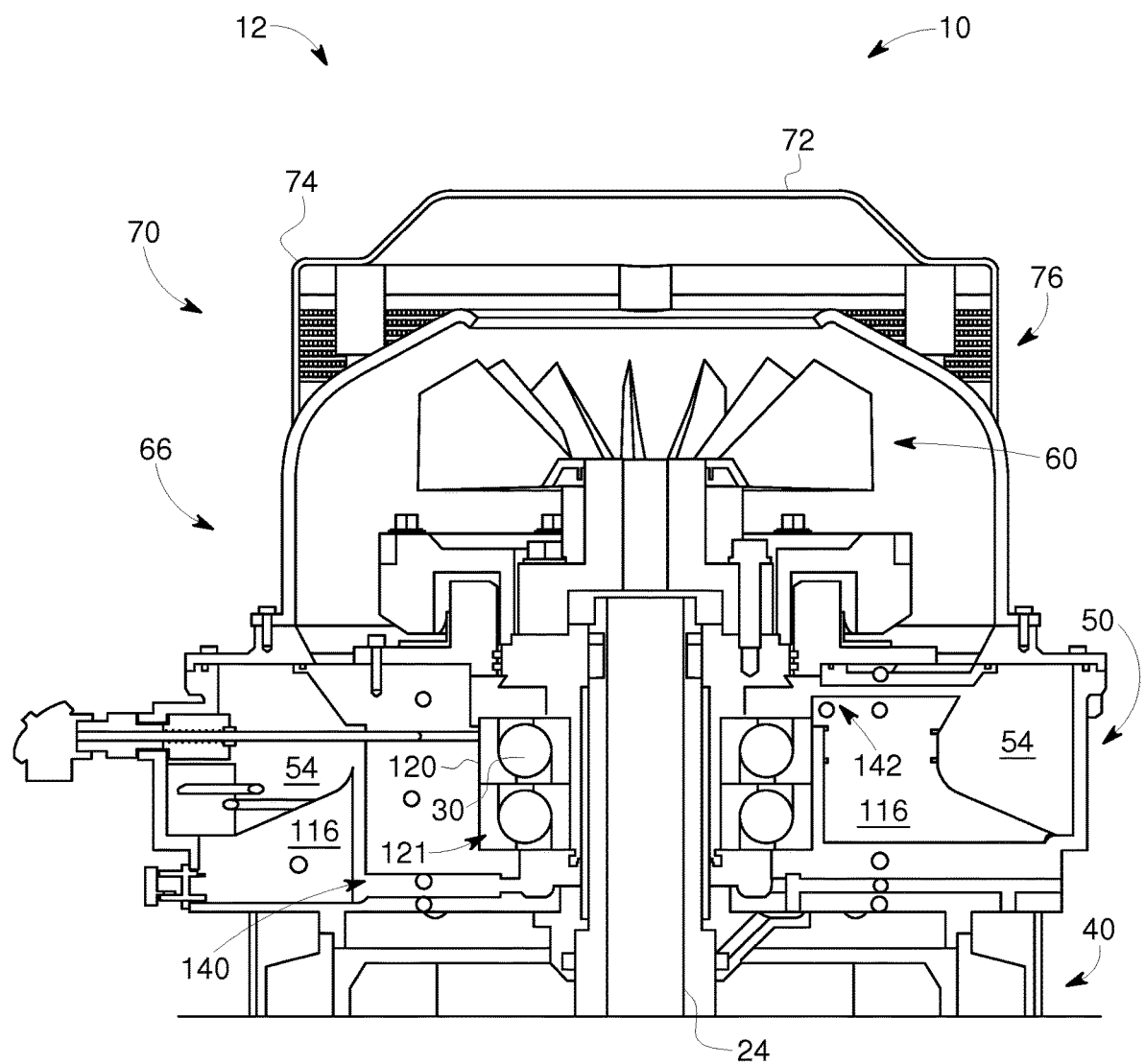
FIG. 6 is a partial side elevational cross-sectional view of the TEFC induction motor of FIG. 1.

FIGS. 4 and 6 Oil Feed Tube

Referring to FIG. 4, an oil feed tube 140 is opposite an oil outlet drain 142. Oil lubricant exiting the interior of the bearing wall 120 through the oil outlet drain 142 takes a path through the oil reservoir 54 back to the oil feed tube 140. The oil lubricant can enter the interior of the bearing wall 120 through the oil feed tube 140 to lubricate the upper bearing 30. A path 144 along the oil reservoir wall 112 is the shortest return path from the oil outlet drain 142 to the oil feed tube 140. In other words, the oil reservoir wall 112, which is air cooled, is expected to be in contact with a higher volume of oil (e.g., versus an opposed outer oil reservoir wall) as the oil takes the shortest path to be recycled through the upper bearing 30.

Referring to FIG. 6, one of the sidewalls 116 includes the oil feed tube 140 and another of the sidewalls 116 includes the oil outlet drain 142. Each of the oil feed tube 140 and the oil outlet drain 142 connects the oil reservoir 54 to the bearing housing space 121. The oil feed tube 140 includes an opening to the bearing housing space 121 below the bearing wall 124 and the oil outlet drain 142 includes an opening to the bearing housing space 121 through the oil splash wall 122.

Because oil feed tube 140 and the oil outlet drain 142 are in sidewalls 116, heat is removed from lubricant as it travels through the oil feed tube 140 and the oil outlet drain 142.

Figure 7:
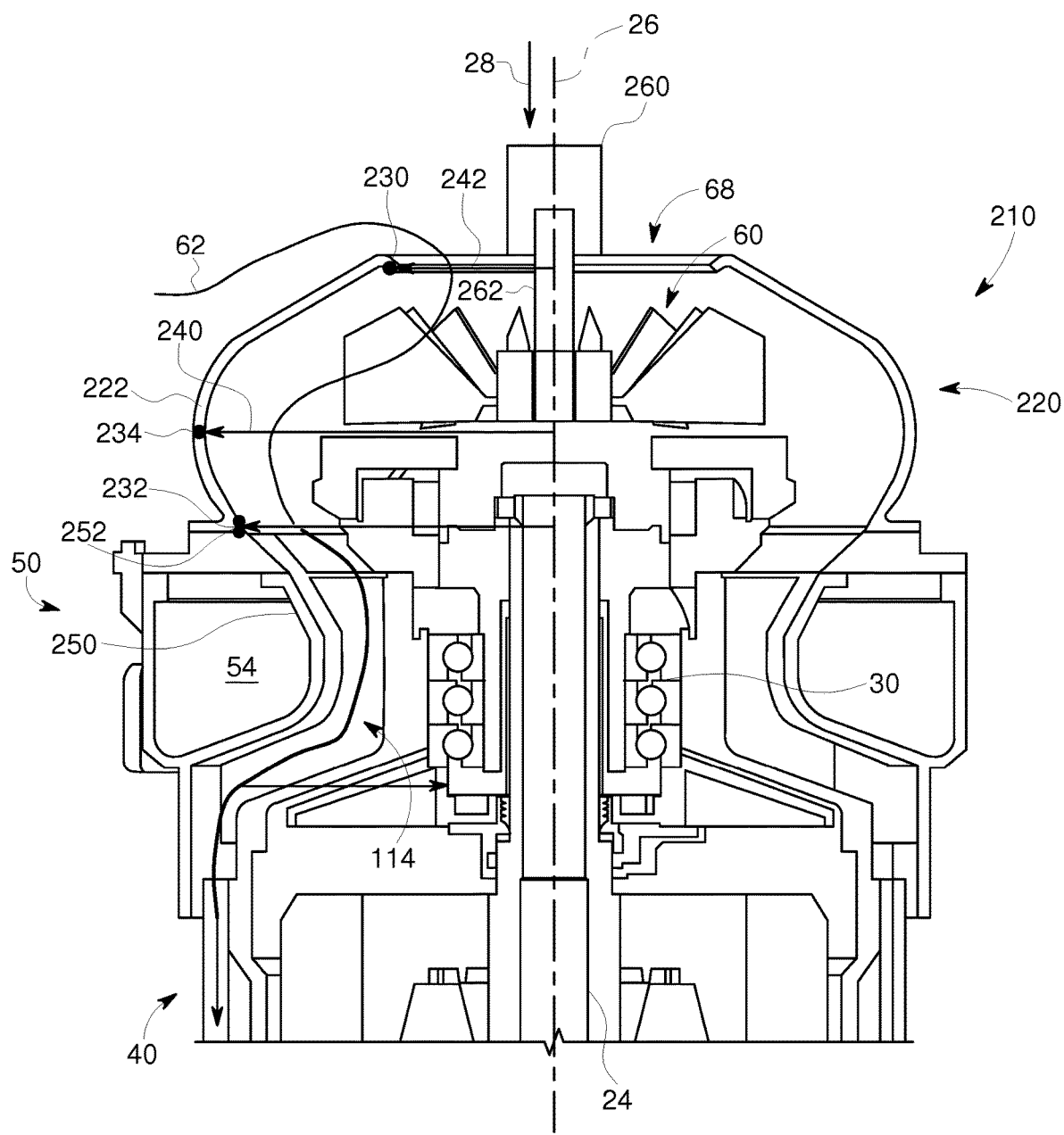
FIG. 7 is a partial cross-sectional view of a TEFC induction motor, according to an exemplary embodiment.

FIG. 7 Fan Cover Guard Wall and Blower

Referring to FIG. 7, an alternative embodiment of a TEFC induction motor 210 is described. For clarity, where the TEFC induction motor 210 includes an element that is substantially similar to an element described above with respect to TEFC induction motor 10, the same numeral that is used to identify the element of TEFC induction motor 10 is used to indicate the element of TEFC induction motor 210. In general, elements that are described above are not again described in detail. Rather, the description above is generally applicable to the similarly-numbered elements below.

The motor 210 includes a fan cover guard 220 that is similar to the fan cover guard 66 except a shape described in further detail below. The fan cover guard 220 is dome-shaped with a curvature that is concave around the fan 60. A wall 222 of the fan cover guard 220 includes an upstream end 230 and a downstream end 232 that are positioned radially inward with respect to a radially outwardmost point 234 of the wall 222. A radial distance 240 from the longitudinal axis 26 to the radially outwardmost point 234 is greater than each of a radial distance 242 from the longitudinal axis 26 to the upstream end 230 and a radial distance 244 to the downstream end 232.

The fan cover guard 220 is curved to smoothly transition air flow over the wall 222 to an outer wall 250 of a channel 114 of an upper endshield 50. For example, the downstream end 232 of the wall 222 meets an upstream end 252 of the outer wall 250 of the channel 114 and the walls 222, 250 are substantially coplanar at the meeting point. In this way, the wall 222 and the channel 114 direct the path 62 radially inwardly and downstream to an upper bearing 30.

The dome-shaped wall 222 increases the mass and volume flow rate through the channel 114. Additionally, the vortex air flow pattern through the tubes 115, adjacent to the upper bearing 30, the oil lubricant, and electrical component housing, improves heat transfer. The vortex flow pattern is a rotating air column that maintains air turbulence to create high heat transfer across the wall surfaces housing the bearings, lubricant, and electrical heat.

In this embodiment an accessory motor 260 drives a shaft 262, separate from the shaft 24, to which the fan 60 is attached. The accessory motor 260 can be used to generate air flow, for example, if the shaft 24 is rotated at a relatively low speed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A motor comprising:
   a stator frame housing a rotor and a stator in an electrical components housing space;
   an endshield at least partially covering an open end of the stator frame and housing a bearing in a bearing housing space;
   a fan cover guard housing a fan, wherein the endshield is positioned between the stator frame and the fan cover guard;
   a shaft to which each of the rotor and the bearing is connected, wherein the shaft defines a longitudinal axis;
   a channel that is configured to direct an air stream that moves in a downstream direction, through the endshield, and from an upstream end of the channel, radially inward toward the bearing,
   wherein the channel includes a plurality of tubes, wherein each of the plurality of tubes includes an inner wall, an outer wall, a first side wall, and a second side wall,
   wherein each of the first side wall and the second side wall extends between the inner wall and the outer wall,
   wherein the outer wall includes a wall between the tube and an oil reservoir,
   wherein the inner wall of the channel includes a wall between the tube and the bearing housing space, and
   wherein at least one of the first side wall and the second side wall includes one of an oil feed tube and an oil outlet drain that connects the oil reservoir to the bearing housing space.

2. A motor according to claim 1, wherein an inner wall of the channel includes a wall between the channel and the open end of the stator frame.

3. A motor according to claim 1, wherein an inner wall of the channel includes a wall between the channel and the bearing housing space.

4. A motor according to claim 1, wherein an outer wall of the channel includes a wall between the channel and an oil reservoir.

5. A motor according to claim 1, wherein each of the first side wall and the second side wall is a planar structure extending in a radially outward direction from the inner wall to the outer wall.

6. A motor according to claim 1, wherein a cross-sectional area along a path through the channel narrows at the upstream end.

7. A motor according to claim 1, wherein the upstream end of the channel is between the fan and the bearing along the longitudinal axis.

8. A motor according to claim 1, wherein the channel is configured to direct the air stream radially outward away from the bearing to a downstream end of the channel.

9. A motor according to claim 8, wherein the bearing is between the upstream end of the channel and the downstream end of the channel along the longitudinal axis.

10. A motor according to claim 1, wherein the endshield includes an oil reservoir and the channel separates the oil reservoir from the electrical components housing space.

11. A motor according to claim 1, wherein the shaft is a first shaft, the motor is a first motor, and the fan is attached to one of:
    the first shaft; and
    a second shaft, wherein the second shaft is configured to be driven by a second motor.

12. A motor according to claim 1, wherein one of the fan guard and an upstream outer surface of the endshield is configured to direct the air stream radially inward toward the bearing.

13. A motor comprising:
    a stator frame housing a rotor and a stator in an electrical components housing space;
    an endshield at least partially covering an open end of the stator frame and housing a bearing in a bearing housing space;
    a fan cover guard housing a fan, wherein the endshield is positioned between the stator frame and the fan cover guard;
    a shaft to which each of the rotor and the bearing is connected, wherein the shaft defines a longitudinal axis;
    a channel that is configured to direct an air stream that moves in a downstream direction, through the endshield, and from an upstream end of the channel, radially inward toward the bearing, wherein the channel is configured to direct the air stream radially outward away from the bearing to a downstream end of the channel, wherein the bearing is between the upstream end of the channel and the downstream end of the channel along the longitudinal axis, wherein a first radial distance to the channel, at a point along the longitudinal axis that is aligned with the bearing, is less than each of:

a second radial distance to the upstream end of the channel; and a third radial distance to the downstream end of the channel; and wherein each radial distance is measured from the longitudinal axis in a radial direction.

14. A motor comprising:

a stator frame housing a rotor and a stator in an electrical components housing space;

an endshield at least partially covering an open end of the stator frame and housing a bearing in a bearing housing space;

a fan cover guard housing a fan, wherein the endshield is positioned between the stator frame and the fan cover guard;

a shaft to which each of the rotor and the bearing is connected, wherein the shaft defines a longitudinal axis;

a channel that is configured to direct an air stream that moves in a downstream direction, through the endshield, and from an upstream end of the channel, radially inward toward the bearing, wherein the endshield includes an oil reservoir and the channel separates the bearing housing space from the oil reservoir.

* * * * *